No. 817,827. PATENTED APR. 17, 1906.
A. G. WILSON.
SYSTEM OF CHARGING STORAGE BATTERIES.
APPLICATION FILED MAR. 14, 1905.
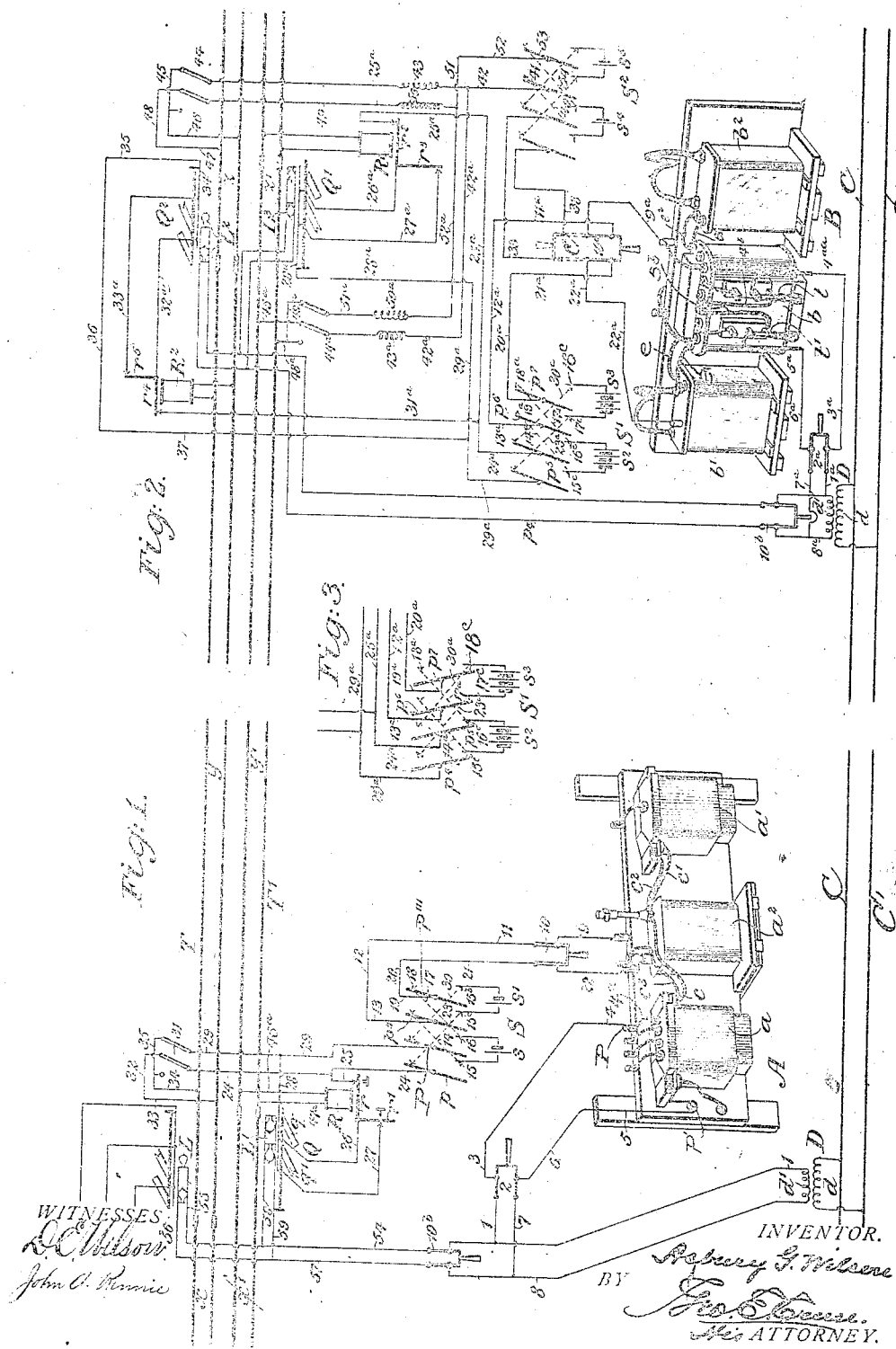

UNITED STATES PATENT OFFICE.

ASBURY G. WILSON, OF WILKINSBURG, PENNSYLVANIA, ASSIGNOR TO THE UNION SWITCH AND SIGNAL COMPANY, OF SWISSVALE, PENNSYLVANIA, A CORPORATION OF PENNSYLVANIA.

SYSTEM OF CHARGING STORAGE BATTERIES.

No. 817,827.     Specification of Letters Patent.     Patented April 17, 1906.

Application filed March 14, 1905. Serial No. 250,020.

*To all whom it may concern:*

Be it known that I, ASBURY G. WILSON, a citizen of the United States, residing at Wilkinsburg, in the county of Allegheny and State of Pennsylvania, have invented certain new and useful Improvements in Systems of Charging Storage Batteries, of which the following is a specification.

My invention relates more particularly to railway signaling systems wherein electric currents are employed as the motive power for operating the translating or other devices and apparatus in the signaling system, and in the present instance it is more particularly intended for use in connection with those systems employing storage batteries as the source of current-supply for the translating or other devices and apparatus used in the signaling system.

I prefer to use as the primary source of electric supply an alternating current and to employ means for changing or transforming such alternating current into a unidirectional current. Any suitable transforming device may be used, and in the present instance I have shown one commonly known in the art as a "rectifier." This transforming device is commercially known as an "alternating-current rectifier," and in the present invention it is connected with the mains or feed-wires on which alternating current of high voltage is impressed, such current being changed or transformed within said rectifier into a unidirectional current and fed to suitable batteries conveniently situated between the rectifier and the signals and from which current is supplied to the translating or other devices, apparatus, and to the railway-signal-operating mechanisms and track-circuits of the signaling system.

One of the objects of the present invention is to provide storage batteries in a railway signaling system and to charge such storage batteries by a unidirectional current obtained from an alternating-current, feed-wires which may extend from the storage batteries to the circuits of the signaling system, and resistances or other devices may be used in any circuit where it is desired to reduce the voltage or current, or both, supplied from the storage battery.

My invention further contemplates the use of suitable transformers having the usual primaries and secondaries, a current from the main feed-wires being impressed in the primary and induced in the secondary, whence it flows through proper wires to the lamps for lighting the railway-signal. Appropriate controlling-switches are also contemplated for use in connection with my invention, which will be hereinafter fully described.

In the accompanying drawings, Figure 1 shows a partially perspective and partially diagrammatical view of a railway-signal and lighting system embodying my invention, the arrangement and construction therein shown being particularly adaptable for use where a low voltage on both the signal and track is desired. Fig. 2 is a similar view showing a construction and arrangement adaptable for use where a high voltage is desired on the signal and a low voltage on the track-circuits of the signaling system. Fig. 3 is a detail view of two of the batteries shown in Fig. 2, the charging-switch therefor being reversed or moved into position to charge the other battery.

Suitable reference characters are employed to designate the various parts on the drawings, and where such parts may correspond the same characters will be used.

I will now describe my invention in connection with said drawings, which illustrate a portion of a two-track railway and some of the parts and appliances included in a signaling system therefor, as well as the circuits and manner of charging the storage batteries from the main or feed wires of high alternating voltage and will then describe the manner in which the parts and appliances and circuits of the signaling system are supplied with a unidirectional current, finally pointing out the novel features in the claims.

Referring particularly to Fig. 1 of said drawings, A designates the apparatus or means for transforming an alternating current into a unidirectional current, and, as before mentioned, each means may comprise an alternating-current rectifier of the type above mentioned, or it may be of any other suitable and approved kind, being herein shown as comprising transformers $a$ and $a'$, suitably supported and located, respectively, one at each side of a rectifying-cell $a^2$. The connections between the transformers $a$ and $a'$ (which are generally wound to receive the full voltage of alternating-current mains) and the rectifier-cell $a^2$ may be made by wires $a$ $a'$ $a^2$ $a^3$, and the connections between the mains or feed-wires C C' and the transformer $a$ is preferably, but not necessarily, made through the primary $d$ of an appropriate transformer D, which induces an alternating current in the secondary $d'$, said current flowing along a wire 1 through switch 2 and wires 3 and 4 to a binding-post F at one side of the rectifier-transformer $a$, thence by wire $a^4$ to and through the winding therein, thence through wires $e$ $e'$ to and through the winding in the transformer $a'$, (not shown,) through wire $a^5$ and rectifying-cell $a^2$, and wire $a^6$ to a binding-post F', thence along wires 5 and 6, through switch 2, and wires 7 and 8 back to the secondary. In this manner the transformers $a$ and $a'$ are changed when necessary from the main or feed wires, and in order to effect the cut off of supply there to a suitable switch may be provided (as I shall later on describe with respect to Fig. 2) in proximity to the rectifier; but this switch may be readily dispensed with and the switch 2 alone used for that purpose. These connections are arbitrary, however, and may be effected in any other desired manner, as might suggest itself to those skilled in the art.

The storage batteries S may be of any of the usual or ordinary types and may be arranged in groups. As shown, they are arranged in pairs $s$ $s'$, arranged independently of each other and being conveniently located with respect to either the rectifier or railway-signals, as may be found desirable. In the position of the parts shown in Fig. 1 the charging-switch for the batteries S has been shifted to the right in order to bring its contact fingers or plates $p''$ $p'''$ in position to charge the battery $s$, and the circuit leading thereto from the rectifier may be traced by following the wire 9, through which the current passes to an appropriate switch 10, thence through wires 11 12 13, plate $p''$, and wire 14, (dotted lines,) contact 15 constituting the positive pole of the battery $s$, thence through said battery to the opposite or negative pole 16, whence it flows through wire 17 (dotted lines) to contact 18, thence through plate $p'''$ and wires 19 20 21 to switch 10, thence along wire 22 back to the rectifying-cell $a^2$. When charging the other battery $s'$, the plates or fingers $p$ $p'$ and $p''$ $p'''$ will be moved to the left like the plates $p^4$ $p^5$ $p^6$ $p^7$, (shown in Fig. 3,) and the current will then flow from the rectifying-cell $a^2$ in the same manner as just described, passing through the plate $p''$ and contact $15^a$, constituting the positive pole of the battery $s'$, through said battery to the opposite or negative pole $16^b$, thence through plate $p'''$ along wires 19 20 21 through the switch 10, and wire 22 back to the rectifying-cell $a^2$.

During the operation of charging one of the batteries or sets of batteries, which may be comprised in any one series, the other battery or set of batteries in that particular series will be cut off from the source of supply, but will be in condition to discharge, and so feed the parts and appliances and circuits of the signaling system, it being obvious that while the charging-switch is in the position shown in Fig. 1 the battery $s$ is being charged while the battery $s'$ is cut off and free to discharge. The battery $s'$ is shown as discharging current, the current flowing from positive side of battery through a wire 23 (dotted lines) to the plate $p$, thence through wires 24 25 to the springs $r$ $r'$ of a polarized relay R, thence along wires 26 27 to the mechanism of the home and distant railway-signals $q$ $q'$, respectively, thence along wires 28 29 to the plate $p'$, and finally through wire 30 (dotted lines) to the negative side of battery $s'$. Current passing through the wire 24 leads to one arm of a pole-changer 31, thence through wires 32 33 to the track-section T, and along one rail thereof to a relay, corresponding to that designated R² in Fig. 2, through said relay and back through the opposite rail in track-section T, and wires 34 35 to the other arm of pole-changer 31, thence through wire 29 to plate $p'$, and finally through wire 30 (dotted lines) back to the negative side of battery $s'$. The relay R is in circuit with the rails of a section of a track T, and upon entrance of a train thereon within the block marked $y'$ and going to the right said relay, which is under the influence of a battery in the section ahead, will be short-circuited, releasing the springs $r$ $r'$, whereupon the signals are affected to give proper indication that the block is occupied.

I will now describe the arrangement and construction shown in Fig. 2 and the manner of charging the several storage batteries from the mains or feed-wires of high alternating-current voltage and will then describe the manner in which the signals are illuminated.

Referring to the drawings, B designates the apparatus or means for transforming an alternating current into a unidirectional current, and it may take the form of an alternating-current rectifier similar to that just described with reference to Fig. 1, except that in this instance it is shown as comprising a single transformer $b$ and two rectifying-cells $b'$ $b^2$, located, preferably, one on each side of said transformer.

The connections between the transformer $b$ and rectifying-cells $b'$ $b^2$ may be made by the wires $e$ $e'$ and $e^2$ $e^3$, and the connections between the main or feed wires C C' and transformer are made in a similar manner to that shown in Fig. 1—that is, a transformer D is preferably employed, the primary $d$ of which is properly connected to the main or feed wires, as shown, and induces an alternating current in the secondary $d'$, whence it passes through wire $1^a$, switch $2^a$, wires $3^a$ and $4^{aa}$ to a switch $t$ at one side of the rectifier-transformer $b$, thence by wire $4^b$ through the winding therein, (not shown,) and thence to the rectifying-cells $b'$ and $b^2$, through the medium of the wires $e\ e'$ and $e^2\ e^3$ back to the transformer $b$, whence it passes through wire $5^b$ to a switch $t'$ on the opposite side of the transformer, thence through wires $5^a\ 6^a$ to switch $2^a$, and then through wires $7^a$ and $8^a$ back to the secondary $d'$. The switches $t$ and $t'$ may also be dispensed with in this instance and the supply to the transformer $b$ cut off by means of the switch $2^a$. In this construction and arrangement, and especially where it is desired to provide a high voltage for the motor or electric control of the railway-signal mechanism and a low voltage on the track-circuits of the signaling system, two sets of batteries are used. In this way I am enabled to regulate the potential required for the respective batteries so as to suit varying requirements, as well as to minimize in the expenditure of electromagnetic force. Each set of these batteries is arranged in pairs precisely similar to that previously described. The method of charging the batteries is the same in every respect, and the charging-switches are arranged so as to shift from one battery in one set to the other battery in the same set, so as to simultaneously place them in a condition the one to be charged and the other to discharge and supply the signal and track-circuits. The current for the signal mechanisms after passing from the rectifier will charge battery $s^2$ by flowing along the wire $9^a$, thence through switch $10^a$ and along wires $11^a\ 12^a\ 13^a$ to plate $p^6$, thence through wire $14^a$ to the positive pole $15^c$ of the battery $s^2$, through said battery to the opposite or negative pole $16^c$, thence through wire $17^a$ (dotted lines) to contact $18^a$, through plate $p^7$ and wires $19^a\ 20^a\ 21^a$, thence through the switch $10^a$ and wire $22^a$ back to the rectifying-cell $b'$. In charging the battery $s^3$ the switch will of course be reversed to assume the position shown in Fig. 3, the current flowing through wire $9^a$, switch $10^a$, &c., in the manner just described to and through plate $p^6$, thence direct to the positive pole $17^c$ of the battery $s^3$, through the latter to the opposite or negative pole $18^c$ thereof, thence through plate $p^7$ and wires $19^a\ 20^a\ 21^a$ to switch $10^a$, and finally along wire $22^a$ back to rectifying-cell $b'$. As shown, the battery $s^3$ is cut off by the switch and is free to discharge through the wire $30^a$ (dotted lines) at positive side of battery, the current flowing to plate $p^5$, thence through wires $24^a\ 25^a$ to springs $r^2\ r^3$ of a polarized relay $R'$, thence through wires $26^a\ 27^a$ to the home and distant signal mechanisms of the signal $Q'$ in the usual manner, thence through wires $28^a$ $29^a$ to plate $p^4$, and through wire $23^a$ (dotted lines) back to negative side of battery $s^3$. The current from this battery also flows through a wire $31^a$, which is connected to and leads from the wire $25^a$ to springs $r^4\ r^5$ of a polarized relay $R^2$ in circuit with the upper track-section T, as previously described, thence through wires $32^a\ 33^a$ to the home and distant signal mechanism of the signal $Q^2$ used in connection with and controlling traffic over the track-section T, whence it flows through wires 34, 35, 36, and 37 to wire $29^a$ and back to the negative side of battery $s^3$, through the plate $p^4$ and wire $23^a$.

The track-circuits of the signaling system in this form of the invention are preferably supplied from separate batteries $S^2$ of much lower voltage, and they are arranged in pairs $s^4\ s^5$ and charged in a similar manner to that just described, the switch $10^a$, however, being first moved to assume the position shown in dotted lines, Fig. 2, to engage contacts $C^\times$ on wires 38 39, respectively, which lead to the charging-switch for the batteries. The current from the rectifier B will flow through the wire $9^a$, switch $10^a$, and wire 38 to the charging-switch, the latter being moved to connect with one or the other of the batteries to be charged, and the current will flow through such battery back to the rectifier through the wire 39, switch $10^a$, and wire $22^a$, as before. The battery $s^4$ in this instance is in condition to discharge, and the current from the positive side thereof will flow through wire 40 (dotted lines) to and through plate 41, thence through wire 42 and resistance-coil 43 to one arm of a pole-changer 44, thence through wires 45 46 through one rail in the block $z$ of track-section T to a relay (similar to relay $R^2$) in the track-section in the rear (not shown) and back through the other rail in said block Z, thence through wires 47 48, through the opposite arm of pole-changer 44, along wires 49, and through resistance-coil 50, thence through wires 51 52 to plate 53, and finally through wire 54 (dotted lines) back to negative side of battery $s^4$. The batteries $S^2$ also connect with and energize the relay in the block $y'$ to the rear—as, for example, the relay R, (shown in Fig. 1)— whereby the signal-blades are kept in their normal position, and the current from said battery will flow through the wires 42 $42^a$ and resistance $43^a$ to one arm of a pole-changer $44^a$, thence through wire $45^a$ and along one rail of the block-section $y'$ to wire $46^a$ through said wire and relay R, thence through wire $47^a$ and along the other rail of track-section $y'$ and through wires $48^a\ 49^a$ to the other arm of pole-changer $44^a$, whence it flows through wire $51^a$, resistance $50^a$, and wire 52 to and through wires 51 52, and finally through plate 53 and wire 54 back to negative side of battery $s^5$.

The lights L, L', $L^2$, and $L^3$ are appropriately arranged with relation to the signal devices of the railway-signals, and as the circuits are precisely the same in both instances I will confine myself to a description of those shown in Fig. 1, where it will be seen that the wire 1 from one side of the secondary $d'$ connects with a switch $10^b$ and the alternating current induced in the secondary flows through said wire 1 and switch $10^b$ to and through wires 54 55 to the lights L L² and back again through wires 56 57 switch $10^b$, and wire 8 to the other side of the secondary. Current to the lights L' L³ is derived from the same source, being fed thereto through the wires 54 58 and back through wires 59 57, switch $10^b$, and wire 8 to the opposite end of the secondary $d'$.

The switches 2 2ᵃ may be disconnected from the main or feed wires to cut off the supply to the rectifier when desired, and the switches $10^b$ may also be manipulated to disconnect and cut off the alternating-current supply to the lights, as will be understood.

What I claim as my invention is—

1. A railway signaling system, having a primary source of alternating-current supply, means for changing the alternating current into a unidirectional current, storage batteries charged by said unidirectional current, and feed-wires extending from said storage batteries to the signaling system.

2. A railway signaling system, having as a primary source of electric supply an alternating current, a rectifying device in circuit with said source of supply and wherein it is changed or transformed into a unidirectional current, and storage batteries in circuit with said rectifying device and with the signal-operating mechanisms and track.

3. A railway signaling system, having as a primary source of electric supply an alternating current, a transformer in circuit therewith and with a rectifying device, in which latter, said source of supply is transformed into a unidirectional current, and storage batteries in circuit with said rectifying device and with the railway signaling system.

4. A railway signaling and lighting system, having as a primary source of electric supply an alternating current of high voltage, a rectifying device in circuit with said source of supply and wherein it is changed or transformed into a unidirectional current, storage batteries in circuit with said rectifying device and with the signaling and lighting systems, and means for controlling the current-supply.

5. A railway signaling and lighting system, having as a primary source of electric supply, an alternating current of high voltage, a transformer in circuit therewith and with a rectifying device in which latter said source of supply is changed or transformed into a unidirectional current, storage batteries in circuit with said rectifying device and with the signaling and lighting system, and means for controlling the current-supply.

6. A railway signaling and lighting system, having as a primary source of electric supply, an alternating current, a rectifying device in circuit with said source of current-supply and wherein it is changed or transformed into a unidirectional current, storage batteries of high and low potential, arranged in pairs or sets and in circuit with said rectifying device, one set of said batteries being in circuit with the railway-signal operating mechanism and lighting system, and the other set in circuit with the track-circuits of the signaling system, and means for controlling the charging of said batteries.

7. A railway signaling and lighting system, having as a primary source of electric supply, an alternating current of high voltage, a transformer having its primary in circuit with said source of supply and its secondary in circuit with a rectifying device wherein the alternating current is changed or transformed into a unidirectional current, circuits extending from said secondary to the lighting system, and batteries in circuit with said rectifying device and with the railway-signal-operating mechanisms and the track-circuits of the signaling system.

8. A railway signaling system, having as a primary source of electric supply, an alternating current of high voltage, a transformer having its primary in circuit with said source of supply and its secondary in circuit with a rectifying device where the alternating current is changed or transformed into a unidirectional current, batteries in circuit with said rectifying device and with the railway-signal-operating mechanisms and track-circuits of the signaling systems, and means for controlling the current-supply.

9. In a railway signaling system the combination of mains impressed with an alternating current, means for receiving current from said mains and for changing it into a unidirectional current, storage batteries charged by the unidirectional current, and feed-conductors extending from said storage batteries to apparatus and circuits used in the signaling system.

In testimony whereof I have signed my name to this specification in the presence of two subscribing witnesses.

ASBURY G. WILSON.

Witnesses:
J. S. HOBSON,
W. L. McDANIEL.